United States Patent
Holz

(10) Patent No.: US 10,620,709 B2
(45) Date of Patent: Apr. 14, 2020

(54) CUSTOMIZED GESTURE INTERPRETATION

(71) Applicant: Leap Motion, Inc., San Francisco, CA (US)

(72) Inventor: David Holz, San Francisco, CA (US)

(73) Assignee: ULTRAHAPTICS IP TWO LIMITED, Bristol (GB)

( * ) Notice: Subject to any disclaimer, the term of this patent is extended or adjusted under 35 U.S.C. 154(b) by 608 days.

(21) Appl. No.: 14/156,429

(22) Filed: Jan. 15, 2014

(65) Prior Publication Data

US 2014/0304665 A1 Oct. 9, 2014

Related U.S. Application Data

(60) Provisional application No. 61/808,959, filed on Apr. 5, 2013, provisional application No. 61/808,984, filed on
(Continued)

(51) Int. Cl.
*G06F 3/01* (2006.01)
*G06K 9/00* (2006.01)

(52) U.S. Cl.
CPC ......... *G06F 3/017* (2013.01); *G06K 9/00335* (2013.01)

(58) Field of Classification Search
None
See application file for complete search history.

(56) References Cited

U.S. PATENT DOCUMENTS 2,665,041 A 1/1954 Maffucci
4,175,862 A 11/1979 DiMatteo et al.
(Continued)

FOREIGN PATENT DOCUMENTS

CN 105308536 A 2/2016
DE 11 2014 000 441 T5 10/2015
(Continued)

OTHER PUBLICATIONS

U.S. Appl. No. 14/281,804—Office Action dated Mar. 11, 2016, 11 pages.
(Continued)

*Primary Examiner* — Tuan S Nguyen
(74) *Attorney, Agent, or Firm* — Haynes Beffel & Wolfeld LLP; Ernest J. Beffel, Jr.; Andrew L. Dunlap

(57) ABSTRACT

The technology disclosed relates to filtering gestures, according to one implementation. In particular, it relates to distinguishing between interesting gestures from non-interesting gestures in a three-dimensional (3D) sensory space by comparing characteristics of user-defined reference gestures against characteristics of actual gestures performed in the 3D sensory space. Based on the comparison, a set of gestures of interest are filtered from all the gestures performed in the 3D sensory space. The technology disclosed also relates to customizing gesture interpretation for a particular user, according to another implementation. In particular, it relates to setting parameters for recognizing gestures by prompting the user to select values for characteristics of the gestures. In one implementation, the technology disclosed includes performing characteristic focused demonstrations of boundaries of the gesture. It further includes testing the interpretation of gestures by prompting the user to perform complete gesture demonstrations and receiving evaluation from the user regarding the interpretation.

32 Claims, 7 Drawing Sheets

Related U.S. Application Data on Apr. 5, 2013, provisional application No. 61/872,538, filed on Aug. 30, 2013.

(56) References Cited

U.S. PATENT DOCUMENTS

| | | |
|---|---|---|
| 4,879,659 A | 11/1989 | Bowlin et al. |
| 5,134,661 A | 7/1992 | Reinsch |
| 5,282,067 A | 1/1994 | Liu |
| 5,454,043 A | 9/1995 | Freeman |
| 5,574,511 A | 11/1996 | Yang et al. |
| 5,581,276 A | 12/1996 | Cipolla et al. |
| 5,594,469 A | 1/1997 | Freeman et al. |
| 5,742,263 A | 4/1998 | Wang et al. |
| 5,900,863 A | 5/1999 | Numazaki |
| 5,901,170 A | 5/1999 | Peysakhovich et al. |
| 6,002,808 A | 12/1999 | Freeman |
| 6,031,161 A | 2/2000 | Baltenberger |
| 6,031,661 A | 2/2000 | Tanaami |
| 6,072,494 A | 6/2000 | Nguyen |
| 6,075,892 A | 6/2000 | Fan et al. |
| 6,075,895 A | 6/2000 | Qiao et al. |
| 6,147,678 A | 11/2000 | Kumar et al. |
| 6,154,558 A | 11/2000 | Hsieh |
| 6,181,343 B1 | 1/2001 | Lyons |
| 6,184,326 B1 | 2/2001 | Razavi et al. |
| 6,184,926 B1 | 2/2001 | Khosravi et al. |
| 6,195,104 B1 | 2/2001 | Lyons |
| 6,204,852 B1 | 3/2001 | Kumar et al. |
| 6,252,598 B1 | 6/2001 | Segen |
| 6,256,033 B1 * | 7/2001 | Nguyen ............... G06F 3/017 345/156 |
| 6,263,091 B1 | 7/2001 | Jain et al. |
| 6,493,041 B1 | 12/2002 | Hanko et al. |
| 6,498,628 B2 | 12/2002 | Iwamura |
| 6,603,867 B1 | 8/2003 | Sugino et al. |
| 6,661,918 B1 | 12/2003 | Gordon et al. |
| 6,702,494 B2 | 3/2004 | Dumler et al. |
| 6,798,628 B1 | 9/2004 | Macbeth |
| 6,804,654 B2 | 10/2004 | Kobylevsky et al. |
| 6,804,656 B1 | 10/2004 | Rosenfeld et al. |
| 6,814,656 B2 | 11/2004 | Rodriguez |
| 6,819,796 B2 | 11/2004 | Hong et al. |
| 6,901,170 B1 | 5/2005 | Terada et al. |
| 6,919,880 B2 | 7/2005 | Morrison et al. |
| 6,950,534 B2 | 9/2005 | Cohen et al. |
| 6,993,157 B1 | 1/2006 | Oue et al. |
| 7,213,707 B2 | 5/2007 | Hubbs et al. |
| 7,215,828 B2 | 5/2007 | Luo |
| 7,244,233 B2 | 7/2007 | Krantz et al. |
| 7,257,237 B1 | 8/2007 | Luck et al. |
| 7,259,873 B2 | 8/2007 | Sikora et al. |
| 7,308,112 B2 | 12/2007 | Fujimura et al. |
| 7,340,077 B2 | 3/2008 | Gokturk et al. |
| 7,519,223 B2 | 4/2009 | Dehlin et al. |
| 7,532,206 B2 | 5/2009 | Morrison et al. |
| 7,536,032 B2 | 5/2009 | Bell |
| 7,542,586 B2 | 6/2009 | Johnson |
| 7,598,942 B2 | 10/2009 | Underkoffler et al. |
| 7,606,417 B2 | 10/2009 | Steinberg et al. |
| 7,646,372 B2 | 1/2010 | Marks et al. |
| 7,656,372 B2 | 2/2010 | Sato et al. |
| 7,665,041 B2 | 2/2010 | Wilson et al. |
| 7,692,625 B2 | 4/2010 | Morrison et al. |
| 7,831,932 B2 | 11/2010 | Josephsoon et al. |
| 7,840,031 B2 | 11/2010 | Albertson et al. |
| 7,861,188 B2 | 12/2010 | Josephsoon et al. |
| 7,886,229 B2 | 2/2011 | Pachet |
| 7,886,236 B2 | 2/2011 | Kolmykov-Zotov et al. |
| 7,940,885 B2 | 5/2011 | Stanton et al. |
| 7,948,493 B2 | 5/2011 | Klefenz et al. |
| 7,971,156 B2 | 6/2011 | Albertson et al. |
| 7,980,885 B2 | 7/2011 | Gattwinkel et al. |
| 8,064,704 B2 | 11/2011 | Kim et al. |
| 8,085,339 B2 | 12/2011 | Marks |
| 8,086,971 B2 | 12/2011 | Radivojevic et al. |
| 8,111,239 B2 | 2/2012 | Pryor et al. |
| 8,112,719 B2 | 2/2012 | Hsu et al. |
| 8,144,233 B2 | 3/2012 | Fukuyama |
| 8,185,176 B2 | 5/2012 | Mangat et al. |
| 8,213,707 B2 | 7/2012 | Li et al. |
| 8,230,852 B2 | 7/2012 | Zhang et al. |
| 8,235,529 B1 | 8/2012 | Raffle et al. |
| 8,244,233 B2 | 8/2012 | Chang et al. |
| 8,289,162 B2 | 10/2012 | Mooring et al. |
| 8,290,208 B2 | 10/2012 | Kurtz et al. |
| 8,514,221 B2 | 8/2013 | King et al. |
| 8,631,355 B2 | 1/2014 | Murillo et al. |
| 8,638,989 B2 | 1/2014 | Holz |
| 8,659,594 B2 | 2/2014 | Kim et al. |
| 8,659,658 B2 | 2/2014 | Vassigh et al. |
| 8,693,731 B2 | 4/2014 | Holz et al. |
| 8,817,087 B2 | 8/2014 | Weng et al. |
| 8,842,084 B2 | 9/2014 | Andersson et al. |
| 8,843,857 B2 | 9/2014 | Berkes et al. |
| 8,854,433 B1 | 10/2014 | Rafii |
| 8,872,914 B2 | 10/2014 | Gobush |
| 8,930,852 B2 | 1/2015 | Chen et al. |
| 9,056,396 B1 | 6/2015 | Linnell |
| 9,436,288 B2 | 9/2016 | Holz |
| 9,448,634 B1 * | 9/2016 | Wakeford ............... G06F 3/017 |
| 2002/0008211 A1 | 1/2002 | Kask |
| 2002/0105484 A1 | 8/2002 | Navab et al. |
| 2003/0053658 A1 | 3/2003 | Pavlidis |
| 2003/0053659 A1 | 3/2003 | Pavlidis et al. |
| 2003/0081141 A1 | 5/2003 | Mazzapica |
| 2003/0123703 A1 | 7/2003 | Pavlidis et al. |
| 2003/0152289 A1 | 8/2003 | Luo |
| 2003/0202697 A1 | 10/2003 | Simard et al. |
| 2004/0046736 A1 | 3/2004 | Pryor et al. |
| 2004/0068409 A1 * | 4/2004 | Tanaka ................... B25J 9/1656 704/272 |
| 2004/0125228 A1 | 7/2004 | Dougherty |
| 2004/0145809 A1 | 7/2004 | Brenner |
| 2004/0212725 A1 | 10/2004 | Raskar |
| 2005/0068518 A1 | 3/2005 | Baney et al. |
| 2005/0131607 A1 | 6/2005 | Breed |
| 2005/0168578 A1 | 8/2005 | Gobush |
| 2005/0236558 A1 | 10/2005 | Nabeshima et al. |
| 2006/0017807 A1 | 1/2006 | Lee et al. |
| 2006/0072105 A1 | 4/2006 | Wagner |
| 2006/0210112 A1 | 9/2006 | Cohen et al. |
| 2006/0290950 A1 | 12/2006 | Platt et al. |
| 2007/0042346 A1 | 2/2007 | Weller |
| 2007/0130547 A1 | 6/2007 | Boillot |
| 2007/0206719 A1 | 9/2007 | Suryanarayanan et al. |
| 2007/0236475 A1 | 10/2007 | Wherry |
| 2007/0238956 A1 | 10/2007 | Haras et al. |
| 2008/0005703 A1 * | 1/2008 | Radivojevic ......... G06F 1/1626 715/863 |
| 2008/0013826 A1 | 1/2008 | Hillis et al. |
| 2008/0056752 A1 | 3/2008 | Denton et al. |
| 2008/0064954 A1 | 3/2008 | Adams et al. |
| 2008/0106746 A1 | 5/2008 | Shpunt et al. |
| 2008/0113756 A1 | 5/2008 | Williams et al. |
| 2008/0141181 A1 | 6/2008 | Ishigaki et al. |
| 2008/0174547 A1 * | 7/2008 | Kanevsky ............... G06F 3/017 345/156 |
| 2008/0273764 A1 | 11/2008 | Scholl |
| 2008/0278589 A1 | 11/2008 | Thorn |
| 2008/0304740 A1 | 12/2008 | Sun et al. |
| 2008/0319356 A1 | 12/2008 | Cain et al. |
| 2009/0102840 A1 | 4/2009 | Li |
| 2009/0103780 A1 | 4/2009 | Nishihara et al. |
| 2009/0122146 A1 | 5/2009 | Zalewski et al. |
| 2009/0203993 A1 | 8/2009 | Mangat et al. |
| 2009/0203994 A1 | 8/2009 | Mangat et al. |
| 2009/0217211 A1 * | 8/2009 | Hildreth ............... G06F 3/017 715/863 |
| 2009/0257623 A1 | 10/2009 | Tang et al. |
| 2009/0274339 A9 | 11/2009 | Cohen et al. |
| 2009/0309710 A1 | 12/2009 | Kakinami |
| 2010/0020078 A1 | 1/2010 | Shpunt |
| 2010/0023015 A1 | 1/2010 | Park |
| 2010/0026963 A1 | 2/2010 | Faulstich |

(56) References Cited

U.S. PATENT DOCUMENTS

| | | |
|---|---|---|
| 2010/0027845 A1 | 2/2010 | Kim et al. |
| 2010/0046842 A1 | 2/2010 | Conwell |
| 2010/0053164 A1 | 3/2010 | Imai et al. |
| 2010/0058252 A1 | 3/2010 | Ko |
| 2010/0118123 A1 | 5/2010 | Freedman et al. |
| 2010/0125815 A1 | 5/2010 | Wang et al. |
| 2010/0156676 A1 | 6/2010 | Mooring et al. |
| 2010/0158372 A1 | 6/2010 | Kim et al. |
| 2010/0177049 A1 | 7/2010 | Levy et al. |
| 2010/0177929 A1 | 7/2010 | Kurtz et al. |
| 2010/0201880 A1 | 8/2010 | Iwamura |
| 2010/0219934 A1 | 9/2010 | Matsumoto |
| 2010/0222102 A1 | 9/2010 | Rodriguez |
| 2010/0277411 A1 | 11/2010 | Yee et al. |
| 2010/0278393 A1* | 11/2010 | Snook ............... G06F 3/011 382/107 |
| 2010/0296698 A1 | 11/2010 | Lien et al. |
| 2010/0302357 A1 | 12/2010 | Hsu et al. |
| 2010/0306712 A1 | 12/2010 | Snook et al. |
| 2010/0306713 A1* | 12/2010 | Geisner ............ G06F 3/0481 715/863 |
| 2010/0309097 A1 | 12/2010 | Raviv et al. |
| 2011/0007072 A1 | 1/2011 | Khan et al. |
| 2011/0026765 A1 | 2/2011 | Ivanich et al. |
| 2011/0035666 A1* | 2/2011 | Geisner ............... G06F 3/011 715/709 |
| 2011/0043806 A1 | 2/2011 | Guetta et al. |
| 2011/0057875 A1 | 3/2011 | Shigeta et al. |
| 2011/0066984 A1 | 3/2011 | Li |
| 2011/0080470 A1 | 4/2011 | Kuno et al. |
| 2011/0093820 A1 | 4/2011 | Zhang et al. |
| 2011/0107216 A1 | 5/2011 | Bi |
| 2011/0115486 A1 | 5/2011 | Frohlich et al. |
| 2011/0119640 A1 | 5/2011 | Berkes et al. |
| 2011/0134112 A1 | 6/2011 | Koh et al. |
| 2011/0148875 A1 | 6/2011 | Kim et al. |
| 2011/0169726 A1 | 7/2011 | Holmdahl et al. |
| 2011/0173204 A1 | 7/2011 | Murillo et al. |
| 2011/0173235 A1 | 7/2011 | Aman et al. |
| 2011/0173574 A1 | 7/2011 | Clavin et al. |
| 2011/0181509 A1 | 7/2011 | Rautiainen et al. |
| 2011/0193939 A1 | 8/2011 | Vassigh et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0251896 A1 | 10/2011 | Impollonia et al. |
| 2011/0267259 A1 | 11/2011 | Tidemand et al. |
| 2011/0286676 A1 | 11/2011 | El Dokor |
| 2011/0289455 A1 | 11/2011 | Reville et al. |
| 2011/0289456 A1* | 11/2011 | Reville ............... G06F 3/011 715/830 |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2011/0314427 A1 | 12/2011 | Sundararajan |
| 2012/0038637 A1 | 2/2012 | Marks |
| 2012/0050157 A1 | 3/2012 | Latta et al. |
| 2012/0053015 A1 | 3/2012 | Esaki et al. |
| 2012/0062489 A1 | 3/2012 | Andersson et al. |
| 2012/0062558 A1 | 3/2012 | Lee et al. |
| 2012/0065499 A1 | 3/2012 | Chono |
| 2012/0068914 A1 | 3/2012 | Jacobsen et al. |
| 2012/0079421 A1 | 3/2012 | Arriola |
| 2012/0105613 A1* | 5/2012 | Weng ............ G01C 21/3664 348/77 |
| 2012/0127070 A1 | 5/2012 | Ryoo et al. |
| 2012/0150650 A1* | 6/2012 | Zahand ............ G06Q 30/0251 705/14.58 |
| 2012/0151421 A1 | 6/2012 | Clarkson |
| 2012/0157203 A1 | 6/2012 | Latta et al. |
| 2012/0167134 A1 | 6/2012 | Hendricks et al. |
| 2012/0204133 A1 | 8/2012 | Guendelman et al. |
| 2012/0223959 A1 | 9/2012 | Lengeling |
| 2012/0250936 A1 | 10/2012 | Holmgren |
| 2012/0268410 A1 | 10/2012 | King et al. |
| 2012/0320080 A1 | 12/2012 | Giese et al. |
| 2013/0019204 A1 | 1/2013 | Kotler et al. |
| 2013/0167092 A1 | 6/2013 | Yu et al. |
| 2013/0191911 A1 | 7/2013 | Dellinger et al. |
| 2013/0222640 A1 | 8/2013 | Baek et al. |
| 2013/0239059 A1 | 9/2013 | Chen et al. |
| 2013/0307935 A1 | 11/2013 | Rappel et al. |
| 2013/0321265 A1 | 12/2013 | Bychkov et al. |
| 2014/0113507 A1 | 4/2014 | Vanzetto |
| 2014/0118255 A1 | 5/2014 | Billerbeck |
| 2014/0125813 A1 | 5/2014 | Holz |
| 2014/0134733 A1 | 5/2014 | Wu et al. |
| 2014/0139641 A1 | 5/2014 | Holz |
| 2014/0157135 A1 | 6/2014 | Lee et al. |
| 2014/0157209 A1* | 6/2014 | Dalal .................. G06F 3/017 715/863 |
| 2014/0177913 A1 | 6/2014 | Holz |
| 2014/0201674 A1 | 7/2014 | Holz |
| 2014/0201683 A1 | 7/2014 | Holz |
| 2014/0201684 A1 | 7/2014 | Holz |
| 2014/0201690 A1 | 7/2014 | Holz |
| 2014/0222385 A1 | 8/2014 | Muenster et al. |
| 2014/0223385 A1 | 8/2014 | Ton et al. |
| 2014/0240215 A1 | 8/2014 | Tremblay et al. |
| 2014/0247695 A1 | 9/2014 | Vangeel et al. |
| 2014/0258880 A1* | 9/2014 | Holm ................ G06F 3/017 715/748 |
| 2014/0306903 A1 | 10/2014 | Huang et al. |
| 2014/0307920 A1 | 10/2014 | Holz |
| 2014/0340311 A1 | 11/2014 | Holz |
| 2014/0344731 A1 | 11/2014 | Holz |
| 2014/0344762 A1 | 11/2014 | Grasset et al. |
| 2015/0003673 A1 | 1/2015 | Fletcher |
| 2015/0084864 A1 | 3/2015 | Geiss et al. |
| 2015/0116214 A1 | 4/2015 | Grunnet-Jepsen et al. |
| 2015/0153832 A1 | 6/2015 | Krepec |
| 2015/0220150 A1 | 8/2015 | Plagemann et al. |
| 2015/0220776 A1 | 8/2015 | Cronholm |
| 2015/0227795 A1 | 8/2015 | Starner et al. |
| 2016/0328022 A1 | 11/2016 | Holz |

FOREIGN PATENT DOCUMENTS

| | | |
|---|---|---|
| EP | 1477924 A2 | 11/2004 |
| EP | 2369443 A2 | 9/2011 |
| GB | 2419433 A | 4/2006 |
| JP | 2002512069 A | 4/2002 |
| KR | 20090006825 A | 1/2009 |
| WO | 2014113507 A1 | 7/2014 |

OTHER PUBLICATIONS

U.S. Appl. No. 14/339,367, Non-Final Office Action dated Dec. 3, 2015, 17 pages.

Non-Final Office Action for U.S. Appl. No. 14/155,722 dated Nov. 20, 2015.

U.S. Appl. No. 14/281,817—Office Action, dated Sep. 28, 2015, 5 pages.

PCT/US2014/011737—International Search Report dated May 29, 2014, 5 pages.

PCT/US2014/011737—International Preliminary Report on Patentability dated Jul. 21, 2016, 14 pages.

PCT/US2014/011737—International Search Report and Written Opinion dated May 30, 2015, 20 pages.

U.S. Appl. No. 14/156,418—Office Action dated Aug. 22, 2016, 11 pages.

U.S. Appl. No. 14/156,426—Office Action dated Sep. 19, 2016, 32 pages.

U.S. Appl. No. 14/156,420—Office Action dated Aug. 24, 2016, 8 pages.

U.S. Appl. No. 14/156,424—Office Action dated Sep. 20, 2016, 32 pages.

(56) References Cited

OTHER PUBLICATIONS

U.S. Appl. No. 14/156,420—Response to Aug. 24 Office Action filed Sep. 7, 2016, 12 pages.
U.S. Appl. No. 14/156,418—Response to Aug. 22 Office Action filed Nov. 22, 2016, 7 pages.
U.S. Appl. No. 14/154,730—Office Action dated Nov. 6, 2015, 9 pages.
U.S. Appl. No. 14/262,691—Office Action dated Dec. 11, 2015, 31 pages.
U.S. Appl. No. 14/281,817—Notice of Allowance dated Apr. 22, 2016, 9 pages.
U.S. Appl. No. 15/213,899—Notice of Allowance dated Sep. 14, 2016, 7 pages.
U.S. Appl. No. 14/281,817—Notice of Allowance dated Aug. 2, 2016, 9 pages.
U.S. Appl. No. 14/281,817—Response to Sep. 28 Office Action filed Dec. 28, 2015, 3 pages.
U.S. Appl. No. 14/281,825—Office Action dated Feb. 11, 2016, 19 pages.
U.S. Appl. No. 14/155,722—Office Action dated Nov. 20, 2015, 14 pages.
U.S. Appl. No. 14/281,825—Office Action dated Aug. 25, 2016, 22 pages.
U.S. Appl. No. 14/281,825—Response to Feb. 11 Office Action filed May 11, 2016, 12 pages.
U.S. Appl. No. 14/281,825—Response to Aug. 25 Office Action filed Nov. 15, 2016, 12 pages.
U.S. Appl. No. 14/156,420—Office Action dated Dec. 15, 2016, 36 pages.
U.S. Appl. No. 14/156,424—Office Action dated Mar. 8, 2017, 21 pages.
U.S. Appl. No. 14/156,426—Response to Office Action dated Sep. 19, 2016 filed Dec. 19, 2016, 9 pages.
U.S. Appl. No. 14/156,426—Office Action dated Mar. 9, 2017, 21 pages.
U.S. Appl. No. 14/156,420—Notice of Allowance dated Mar. 7, 2017, 16 pages.
U.S. Appl. No. 14/156,424—Office Action dated Jun. 28, 2017, 17 pages.
U.S. Appl. No. 14/156,424—Response to Office Action dated Mar. 8, 2017 filed May 31, 2017, 10 pages.
CN 201480014375.1—First Office Action dated Jul. 3, 2017, 7 pages.
CN 201480014375.1—Response to First Office Action dated Jul. 3, 2017 filed Nov. 17, 2017, 9 pages.
CN 201480014375.1—Second Office Action dated Jan. 17, 2018, 15 pages.
CN 201480014375.1—Response to Second Office Action dated Jan. 17, 2018 filed Jun. 1, 2018, 17 pages.

* cited by examiner

400C

466 ↓

468 — Lets test a gesture. Please perform a gesture a let me guess if you are doing the gesture properly. Please correct me if I am wrong.

Press "spacebar" before you start and after you finish.

Let me guess now....You didn't do the gesture....Was I right? Y/N?

Press "spacebar" to try again, or "esc" to finish

*FIG. 4C*

CUSTOMIZED GESTURE INTERPRETATION

RELATED APPLICATION

This application claims the benefit of three US provisional patent applications, including: No. 61/808,959, entitled, "GESTURE FILTERING," filed 5 Apr. 2013; No. 61/808,984, entitled, "GESTURE FILTERING," filed 5 Apr. 2013; and No. 61/872,538, entitled, "INTERACTIVE TRAINING RECOGNITION OF FREE SPACE GESTURES FOR INTERFACE AND CONTROL," filed 30 Aug. 2013. The provisional applications are hereby incorporated by reference for all purposes.

FIELD OF THE TECHNOLOGY DISCLOSED

The technology disclosed relates generally to systems and methods for gesture recognition, in particular, for the use of free-space gestures as user input to machines.

BACKGROUND

Traditionally, users have interacted with electronic devices (such as a computer or a television) or computing applications (such as computer games, multimedia applications, or office applications) via indirect input devices, including, for example, keyboards, joysticks, or remote controllers. The user manipulates the input devices to perform a particular operation, such as selecting a specific entry from a menu of operations. Modern input devices, however, include multiple buttons, often in a complex configuration, to facilitate communication of user commands to the electronic devices or computing applications; correct operation of these input devices is often challenging to the user. Additionally, actions performed on an input device generally do not correspond in any intuitive sense to the resulting changes on, for example, a screen display controlled by the device. Input devices can also be lost, and the frequent experience of searching for misplaced devices has become a frustrating staple of modern life.

Touch screens implemented directly on user-controlled devices have obviated the need for separate input devices. A touch screen detects the presence and location of a "touch" performed by a user's finger or other object on the display screen, enabling the user to enter a desired input by simply touching the proper area of a screen. While suitable for small display devices such as tablets and wireless phones, touch screens are impractical for large entertainment devices that the user views from a distance. Particularly for games implemented on such devices, electronics manufacturers have developed systems that detect a user's movements or gestures and cause the display to respond in a narrow context. For example, a user near a TV may perform a sliding hand gesture, which is detected by the gesture-recognition system, in response to the detected gesture, the TV may activate and display a control panel on the screen, allowing the user to make selections thereon using subsequent gestures, for example, the user may move her hand in an "up" or "down" direction, which, again, is detected and interpreted to facilitate channel selection.

Existing systems, however, rely on input elements (e.g., computer mice and keyboards) to supplement any gesture-recognition they may perform. These systems lack the user-interface elements required for anything more than simple commands, and often, recognize these commands only after the user has set up a gesture-recognition environment via a keyboard and mouse. Therefore, a further opportunity arises to introduce a new gesture-recognition system that allows users to interact with a wider variety of applications and games in a more sophisticated manner.

SUMMARY

The technology disclosed relates to filtering gestures, according to one implementation. In particular, it relates to distinguishing between interesting gestures from non-interesting gestures in a three-dimensional (3D) sensory space by comparing characteristics of user-defined reference gestures against characteristics of actual gestures performed in the 3D sensory space. Based on the comparison, a set of gestures of interest are filtered from all the gestures performed in the 3D sensory space.

The technology disclosed also relates to customizing gesture interpretation for a particular user, according to another implementation. In particular, it relates to setting parameters for recognizing gestures by prompting the user to select values for characteristics of the gestures. In one implementation, the technology disclosed includes performing characteristic focused demonstrations of boundaries of the gesture. It further includes testing the interpretation of gestures by prompting the user to perform complete gesture demonstrations and receiving evaluation from the user regarding the interpretation.

Other aspects and advantages of the present technology can be seen on review of the drawings, the detailed description and the claims, which follow.

BRIEF DESCRIPTION OF THE DRAWINGS

In the drawings, like reference characters generally refer to the like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 4A, 4B, and 4C illustrate an exemplary training-guidance flow for user definitions of gestures in accordance with one implementation.

DETAILED DESCRIPTION

Implementations of the technology disclosed relate to methods and systems operating a motion-capture system with reduced power consumption using audio signals. For example, a sequence of images can be correlated to construct a 3-D model of the object, including its position and shape. A succession of images can be analyzed using the same technique to model motion of the object such as free-form gestures. In low-light situations, where free-form gestures cannot be recognized optically with a sufficient degree of reliability, audio signals can supply the direction and location of the object as further described herein.

As used herein, a given signal, event or value is "dependent on" a predecessor signal, event or value if the predecessor signal, event or value influenced the given signal, event or value. If there is an intervening processing element, step or time period, the given signal, event or value can still be "dependent on" the predecessor signal, event or value. If the intervening processing element or step combines more than one signal, event or value, the signal output of the processing element or step is considered "dependent on" to each of the signal, event or value inputs. If the given signal, event or value is the same as the predecessor signal, event or value, this is merely a degenerate case in which the given signal, event or value is still considered to be "dependent on" the predecessor signal, event or value. "Responsiveness" of a given signal, event or value upon another signal, event or value is defined similarly.

Figure 1A:
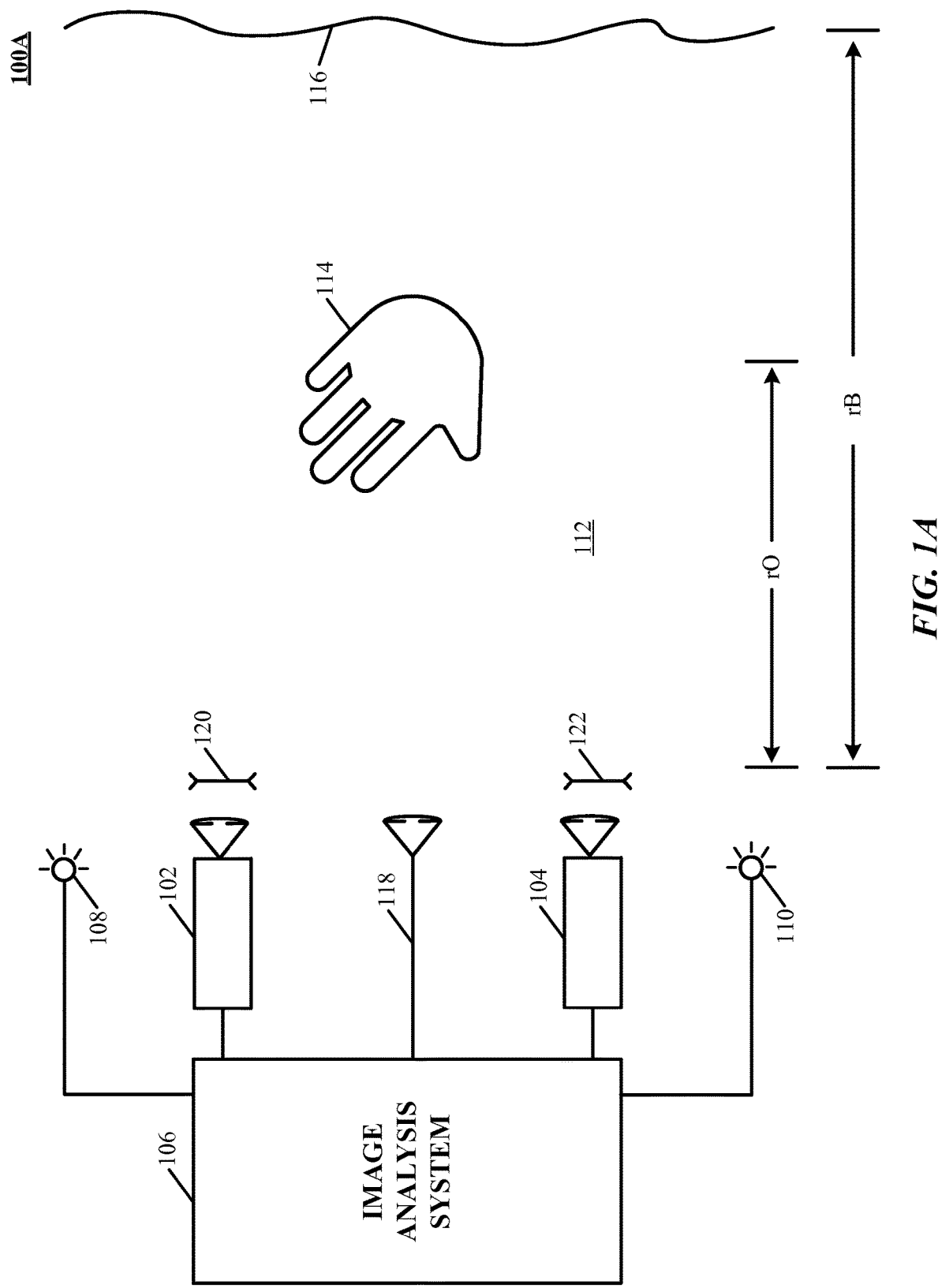
FIG. 1A illustrates a system for capturing image data according to an implementation of the technology disclosed.

Referring first to FIG. 1A, which illustrates an exemplary gesture-recognition system 100A including any number of cameras 102, 104 coupled to an image-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

In some implementations, the illustrated system 100A includes a pair of sources 108, 110, which can be disposed to either side of cameras 102, 104, and are controlled by image-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the gesture-recognition system 100A to operate under a broad range of lighting conditions and can avoid various inconveniences or distractions that may be associated with directing visible light into the region where the person is moving. However, a particular wavelength or region of the electromagnetic spectrum is required. In one implementation, filters 120, 122 are placed in front of cameras 102, 104 to filter out visible light so that only infrared light is registered in the images captured by cameras 102, 104. In another implementation, the sources 108, 110 are sonic sources. The sonic sources transmit sound waves to the user; the user either blocks (or "sonic shadowing") or alters the sound waves (or "sonic deflections") that impinge upon her. Such sonic shadows and/or deflections can also be used to detect the user's gestures. In some implementations, the sound waves are, for example, ultrasound, that is not audible to humans.

It should be stressed that the arrangement shown in FIG. 1A is representative and not limiting. For example, lasers or other light sources can be used instead of LEDs. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 in which a part of a human body 114 (in this example, a hand) that can sometimes also include a tool or other object of interest can be present; cameras 102, 104 are oriented toward the region 112 to capture video images of the hand 114. In some implementations, the operation of light sources 108, 110 and cameras 102, 104 is controlled by the image-analysis system 106, which can be, e.g., a computer system. Based on the captured images, image-analysis system 106 determines the position and/or motion of object 114.

Figure 1B:
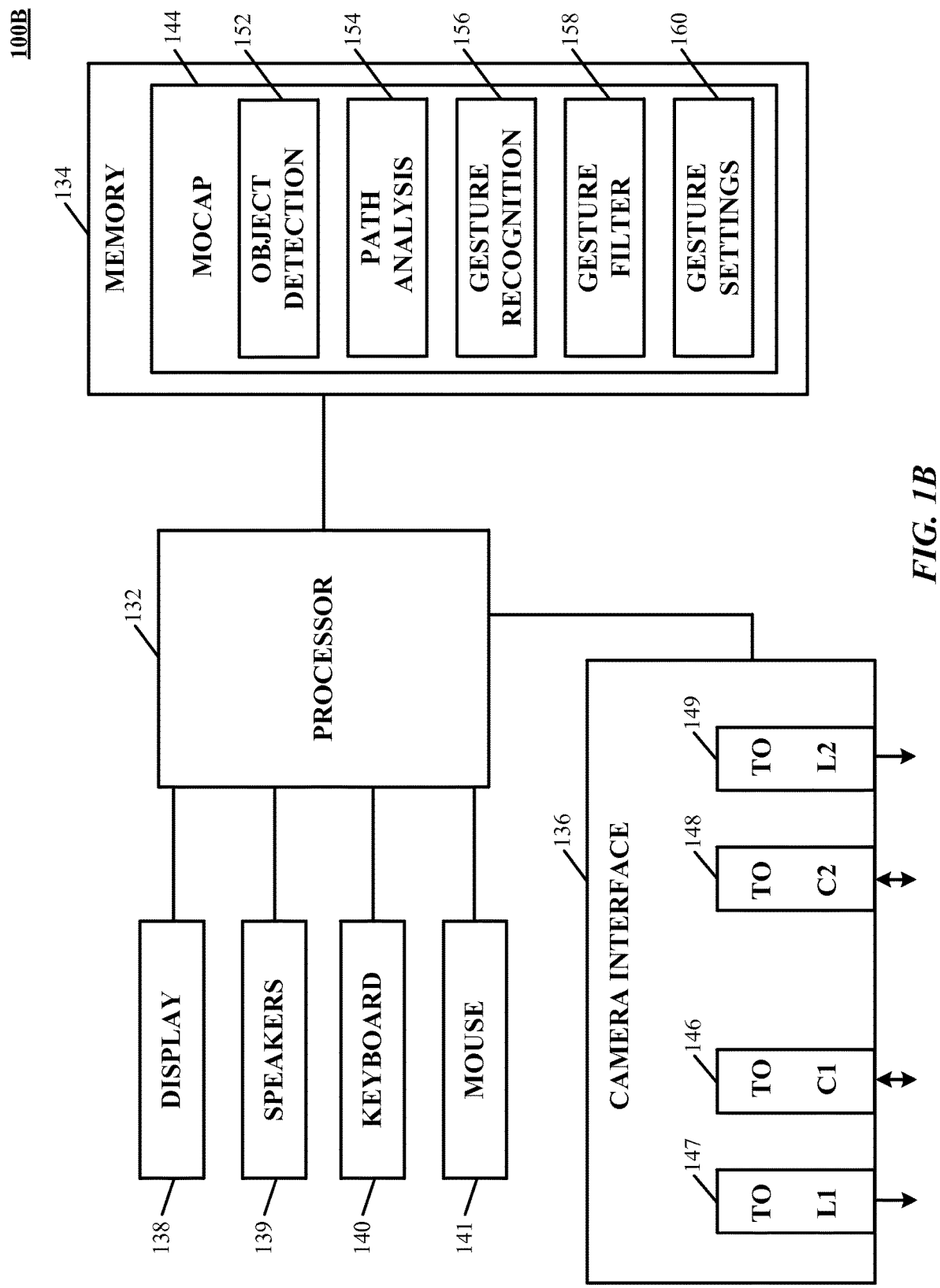
FIG. 1B is a simplified block diagram of a gesture-recognition system implementing an image analysis apparatus according to an implementation of the technology disclosed.

FIG. 1B is a simplified block diagram of a computer system 100B, implementing image-analysis system 106 (also referred to as an image analyzer) according to an implementation of the technology disclosed. Image-analysis system 106 can include or consist of any device or device component that is capable of capturing and processing image data. In some implementations, computer system 100B includes a processor 132, a memory 134, a camera interface 136, a display 138, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below, that control the operation of processor 132 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the steps of the processes of the technology disclosed.

Camera interface 136 can include hardware and/or software that enables communication between computer system 100B and cameras such as cameras 102, 104 shown in FIG. 1A, as well as associated light sources such as light sources 108, 110 of FIG. 1A. Thus, for example, camera interface 136 can include one or more data ports 146, 148 to which cameras can be connected, as well as hardware and/or software signal processors to modify data signals received from the cameras (e.g., to reduce noise or reformat data) prior to providing the signals as inputs to a motion-capture ("mocap") program 144 executing on processor 132. In some implementations, camera interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which may in turn be generated in response to user input or other detected events.

Camera interface 136 can also include controllers 147, 149, to which light sources (e.g., light sources 108, 110) can be connected. In some implementations, controllers 147, 149 supply operating current to the light sources, e.g., in response to instructions from processor 132 executing mocap program 144. In other implementations, the light sources can draw operating current from an external power supply (not shown), and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to camera interface 136. In one implementation, mocap program 144 includes various modules, such as an object detection module 152, an object analysis module 154, and a gesture-recognition module 156. Object detection module 152 can analyze images (e.g., images captured via camera interface 136) to detect edges of an object therein and/or other information about the object's location. Object analysis module 154 can analyze the object information provided by object detection module 152 to determine the 3D position and/or motion of the object (e.g., a user's hand). Examples of operations that can be implemented in code modules of mocap program 144 are described below. Memory 134 can also include other information and/or code modules used by mocap program 144.

Display 138, speakers 139, keyboard 140, and mouse 141 can be used to facilitate user interaction with computer system 100B. In some implementations, results of gesture capture using camera interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, to use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras may be built into the computer rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 1A and 1B, the user performs a gesture that is captured by the cameras 102, 104 as a series of temporally sequential images. These are analyzed by a gesture-recognition module 156, which may be implemented as another module of the mocap 144. Gesture-recognition systems are well-known in the field of computer vision and may utilize algorithms based on 3D models (i.e., volumetric or skeletal models), simplified skeletal models that use a simplified representation of the human body or gesture-relevant body parts, or image-based models based on, for example, deformable templates of gesture-relevant body parts, or other techniques. See, e.g., Wu et al., "Vision-Based Gesture Recognition: A Review," in Gesture-Based Communication in Human-Computer Interaction (Springer 1999); Pavlovic et al., "Visual Interpretation of Hand Gestures for Human-Computer Interaction: A Review," IEEE Trans. Pattern Analysis and Machine Intelligence (19(7): 677-695, July 1997).

The above-described 3D user interaction technique described herein therefore enables the user to intuitively control and manipulate the electronic device and virtual objects by simply performing body gestures. Because the gesture-recognition system facilitates rendering of reconstructed 3D images of the gestures with high detection sensitivity, dynamic user interactions for display control are achieved in real time without excessive computational complexity. For example, the user can dynamically control the relationship between his actual movement and the corresponding action displayed on the screen. In addition, the device may display an on-screen indicator to reflect a degree of completion of the user's gesture in real time. The current technology disclosed thus enables the user to dynamically interact with virtual objects displayed on the screen and advantageously enhances the realism of the virtual environment.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein may be used without departing from the spirit and scope of the technology disclosed. Accordingly, the described implementations are to be considered in all respects as only illustrative and not restrictive.

As discussed above, a gesture-recognition system (e.g., the system 100 illustrated in FIG. 1A) captures images of an object, such as a hand 114, using one or more cameras 102, 104; the object may be illuminated with one or more light sources 108, 110. An object-detection module 152 detects the object, and a gesture-recognition module 156 detects a gesture made using the object. Once detected, the gesture is input to an electronic device, which may use the gesture in a variety of ways (such as in manipulating a virtual object). Many different kinds of gestures may be detected, however, and an application running on the electronic device may not use or need every detected gesture. The sending of the unused gestures to the application may create unnecessary complexity in the application and/or consume unnecessary bandwidth over the link between the application and the gesture-recognition module 156.

In one implementation, only a subset of the gestures captured by the gesture-recognition module 156 are sent to the application running on an electronic device. The recognized gestures may be sent from the gesture-recognition module 156 to a gesture filter 158, as illustrated in FIG. 1A, and filtered based on one or more characteristics of the gestures. Gestures that pass the criteria of the filter 158 are sent to the application, and gestures that do not pass are not sent and/or deleted. The gesture filter 158 is illustrated as a separate module in the memory 134, but the technology disclosed is not limited to only this implementation; the functionality of the filter 158 may be wholly or partially incorporated into the gesture-recognition module 156. In various implementations, the gesture-recognition module 156 recognizes all detected gestures regardless of the settings of the filter 158 or recognizes a subset of detected gestures in accordance with the settings of the filter 158.

Figure 2:
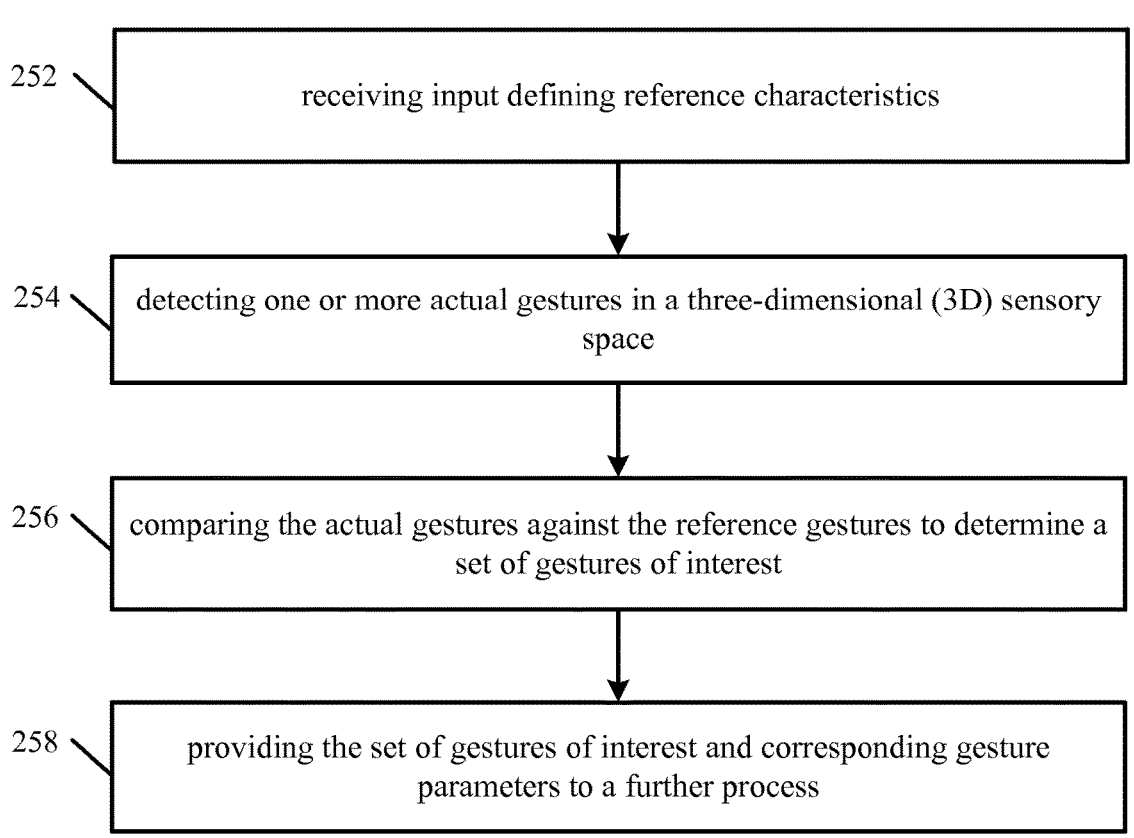
FIG. 2 is a flowchart showing a method of filtering gestures in accordance with implementations of the technology disclosed.

FIG. 2 is a flowchart 200 showing a method of filtering gestures in accordance with implementations of the technology disclosed. In one implementation, a method of distinguishing between interesting gestures from non-interesting gestures in a three-dimensional (3D) sensory space is described. The method includes receiving input defining reference characteristics of one or more reference gestures at action 252, detecting one or more actual gestures in a three-dimensional (3D) sensory space using an electronic sensor and determining actual characteristics using data from the electronic sensor at action 254, comparing the actual gestures against the reference gestures to determine a set of gestures of interest at action 256, and providing the set of gestures of interest and corresponding gesture parameters to a further process at action 258.

In one implementation, when a reference characteristic is gesture path, actual gestures with straight paths, such as lateral sweeps, are interpreted as the set of gestures of interest. When a reference characteristic is gesture velocity, actual gestures with high velocities are interpreted as the set of gestures of interest, according to one implementation. When a reference characteristic is gesture configuration, actual gestures made using a hand pointing with a particular finger are interpreted as the set of gestures of interest, according to one implementation. When a reference characteristic is gesture configuration, actual gestures of hands making a fist are interpreted as the set of gestures of interest, according to one implementation.

In another implementation, when a reference characteristic is gesture shape, actual gestures of hands with thumbs-up are interpreted as the set of gestures of interest. When a reference characteristic is gesture length, waving gestures are interpreted as the set of gestures of interest, according to one implementation. In yet another implementation, when a reference characteristic is gesture position, actual gestures within a threshold proximity to the electronic sensor are interpreted as the set of gestures of interest. When a reference characteristic is gesture duration, actual gestures within the 3D sensory space for a threshold time-period are interpreted as the set of gestures of interest rather than actual gestures within the 3D sensory space for time-period less than the threshold time-period. Of course, more than a single characteristic may be used at one time.

The characteristics of the filter 158 may be defined to suit a particular application or group of applications. In various implementations, the features may be received from a menu interface, read from a command file or configuration file, communicated via an API, or any other similar method. The filter 158 may include sets of preconfigured characteristics and allow a user or application to select one of the sets. Examples of filter characteristics include the path that a gesture makes (the filter 158 may pass gestures having only relatively straight paths, for example, and block gestures having curvilinear paths); the velocity of a gesture (the filter 158 may pass gestures having high velocities, for example, and block gestures having low velocities); and/or the direction of a gesture (the filter may pass gestures having left-right motions, for example, and block gestures having forward-back motions). Further filter characteristics may be based on the configuration, shape, or disposition of the object making the gesture; for example, the filter 158 may pass only gestures made using a hand pointing with a certain finger (e.g., a third finger), a hand making a fist, or an open hand. The filter 158 may further pass only gestures made using a thumbs-up or thumbs-down gesture, for example for a voting application.

The filtering performed by the filter 158 may be implemented as described below. In one implementation, gestures detected by the gesture-recognition module 156 are assigned a set of one or more characteristics (e.g., velocity or path) and the gestures and characteristics are maintained in a data structure. The filter 158 detects which of the assigned characteristics meet its filter characteristics and passes the gestures associated with those characteristics. The gestures that pass the filter 158 may be returned to one or more applications via an API or via a similar method. The gestures may, instead or in addition, be displayed on the display 138 and/or shown in a menu (for, e.g., a live teaching IF application).

As described above, the gesture-recognition module 156 compares a detected motion of an object to a library of known gestures and, if there is a match, returns the matching gesture. In one implementation, a user, programmer, application developer, or other person supplements, changes, or replaces the known gestures with user-defined gestures. If the gesture-recognition module 156 recognizes a user-defined gesture, it returns the gesture to one or more programs via an API (or similar method). In one implementation, with reference again to FIG. 1A, a gesture-settings module 160 screens motions for gestures based on an input of characteristics defining a gesture and returns a set of gestures having matching characteristics.

The user-defined characteristics may include any number of a variety of different attributes of a gesture. For example, the characteristics may include a path of a gesture (e.g., relatively straight, curvilinear; circle vs. swipe); parameters of a gesture (e.g., a minimum or maximum length); spatial properties of the gesture (e.g., a region of space in which the gesture occurs); temporal properties of the gesture (e.g., a minimum or maximum duration of the gesture); and/or a velocity of the gesture (e.g., a minimum or maximum velocity). The technology disclosed is not limited to only these attributes, however, and any other attributes of a gesture are within the scope of the technology disclosed.

A conflict between a user-defined gesture and a predetermined gesture may be resolved in any number of ways. A programmer may, for example, specify that a predetermined gesture should be ignored. In another implementation, a user-defined gesture is given precedence over a predetermined gesture such that, if a gesture matches both, the user-defined gesture is returned.

In various implementations, a gesture training system helps application developers and/or end-users to define their own gestures and/or customize gestures to their needs and preferences—in other words, to go outside the realm of pre-programmed, or "canned," gestures. The gesture training system may interact with the user through normal language, e.g., a series of questions, to better define the action the user wants the system to be able to recognize. By answering these questions in a pre-described setup process, the user defines parameters and/or parameter ranges for the respective gesture, thereby resolving ambiguities. Advantageously, this approach affords reliable gesture recognition without the algorithmic complexity normally associated with the need for the computer to guess the answers; thus, it helps reduce software complexity and cost. In one implementation, once the system has been trained to recognize a particular gesture or action, it may create an object (e.g., a file, data structure, etc.) for this gesture or action, facilitating recognition of the gesture or action thereafter. The object may be used by an application programming interface (API), and may be employed by both developers and non-developer users. In some implementations, the data is shared or shareable between developers and non-developer users, facilitating collaboration and the like.

In some implementation, gesture training is conversational, interactive, and dynamic; based on the responses the user gives, the next question, or the next parameter to be specified, may be selected. The questions may be presented to the user in visual or audio format, e.g., as text displayed on the computer screen or via speaker output. User responses may likewise be given in various modes, e.g., via text input through a keyboard, selection of graphic user-interface elements (e.g., using a mouse), voice commands, or, in some instances, via basic gestures that the system is already familiar to recognize. (For example, a "thumbs-up" or "thumbs-down" gesture may be used to answer any yes-no question.) Furthermore, as illustrated by way of example below, certain questions elicit an action—specifically, performance of an exemplary gesture (e.g., a typical gesture or the extremes of a range of gestures)—rather than a verbal response. In this case, the system may utilize, e.g., machine learning approaches to distill the relevant information from the camera images or video stream capturing the action.

Figure 3:
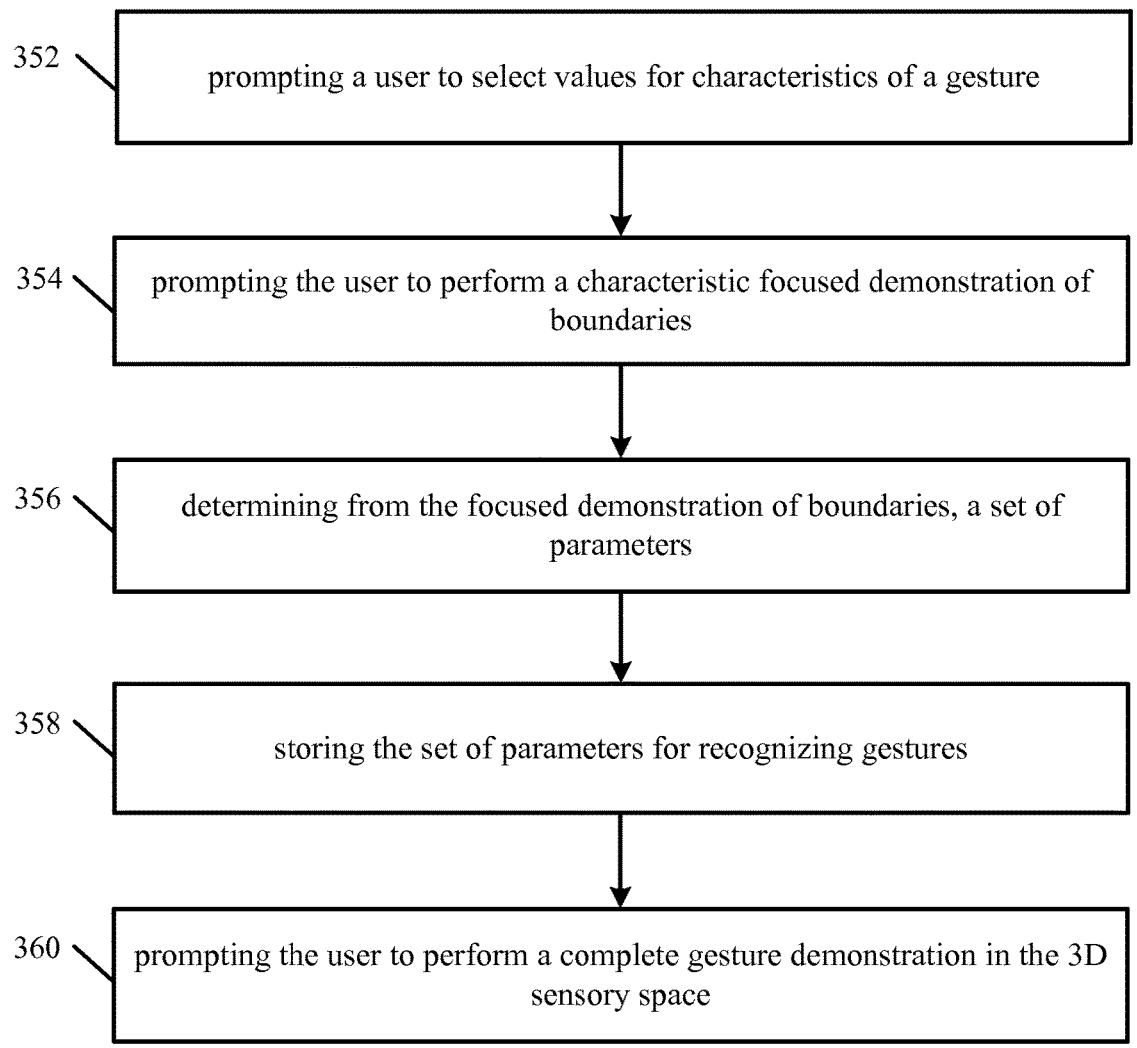
FIG. 3 is a flowchart showing a method of customizing gesture interpretation for a particular user.

FIG. 3 is a flowchart 300 showing a method of customizing gesture interpretation for a particular user. In one implementation, a method of customizing gesture interpretation for a particular user is described. The method includes, prompting a user to select values for characteristics of a gesture in free-space and receiving selected values for the characteristics at action 352, prompting the user, at action 354, to perform a characteristic focused demonstration of boundaries of the gesture in a three-dimensional (3D) sensory space, determining at action 356, from the focused demonstration of boundaries captured by an electronic sensor, a set of parameters of the gesture, and storing the set of parameters and corresponding values for recognizing gestures at action 358.

It further includes testing interpretation of a particular gesture by prompting the user to perform a complete gesture demonstration of the particular gesture in the 3D sensory space, determining, from the complete gesture demonstration captured by the electronic sensor, a set of parameters of the particular gesture, comparing the set of parameters of the particular gesture with corresponding set of parameters determined from the focused demonstration of boundaries and selected values for characteristics, and reporting results of the comparison to the user and receiving a confirmation on whether interpretation of the particular gesture is correct, at action 360.

The method also includes using a questionnaire for prompting the user to select values for characteristics of the gesture. In one implementation, prompting the user to select values for characteristics of the gesture using the questionnaire includes receiving from the user a minimum threshold time-period for the gesture to be within the 3D sensory space before which the gesture is not interpreted. In another implementation, performing characteristic focused demonstration of boundaries includes the user making a hand pointing gesture with a particular finger as a gesture configuration. Performing characteristic focused demonstration of boundaries also includes the user making a fist gesture with a hand as a gesture configuration. Performing characteristic focused demonstration of boundaries further includes the user making thumbs-up or thumb-down gesture with a hand as a gesture shape.

In one implementation, performing characteristic focused demonstration of boundaries includes, the user making a thumbs-up or thumb-down gesture with a hand as a gesture shape. Performing characteristic focused demonstration of boundaries includes the user making a pinch gesture to set a minimum gesture distance as a gesture size, according to one implementation. In another implementation, performing characteristic focused demonstration of boundaries also includes the user making a waving gesture to set a maximum gesture distance as a gesture size.

In yet another implementation, performing characteristic focused demonstration of boundaries includes the user making a finger-flicking gesture to set a fastest gesture motion. In one implementation, performing characteristic focused demonstration of boundaries includes the user making a waving gesture to set a slowest gesture motion. Performing characteristic focused demonstration of boundaries includes the user making a lateral sweep to set a straight gesture path. Performing characteristic focused demonstration of boundaries includes, the user making a circular sweep to set a circular gesture path, according to one implementation.

Figure 4A:
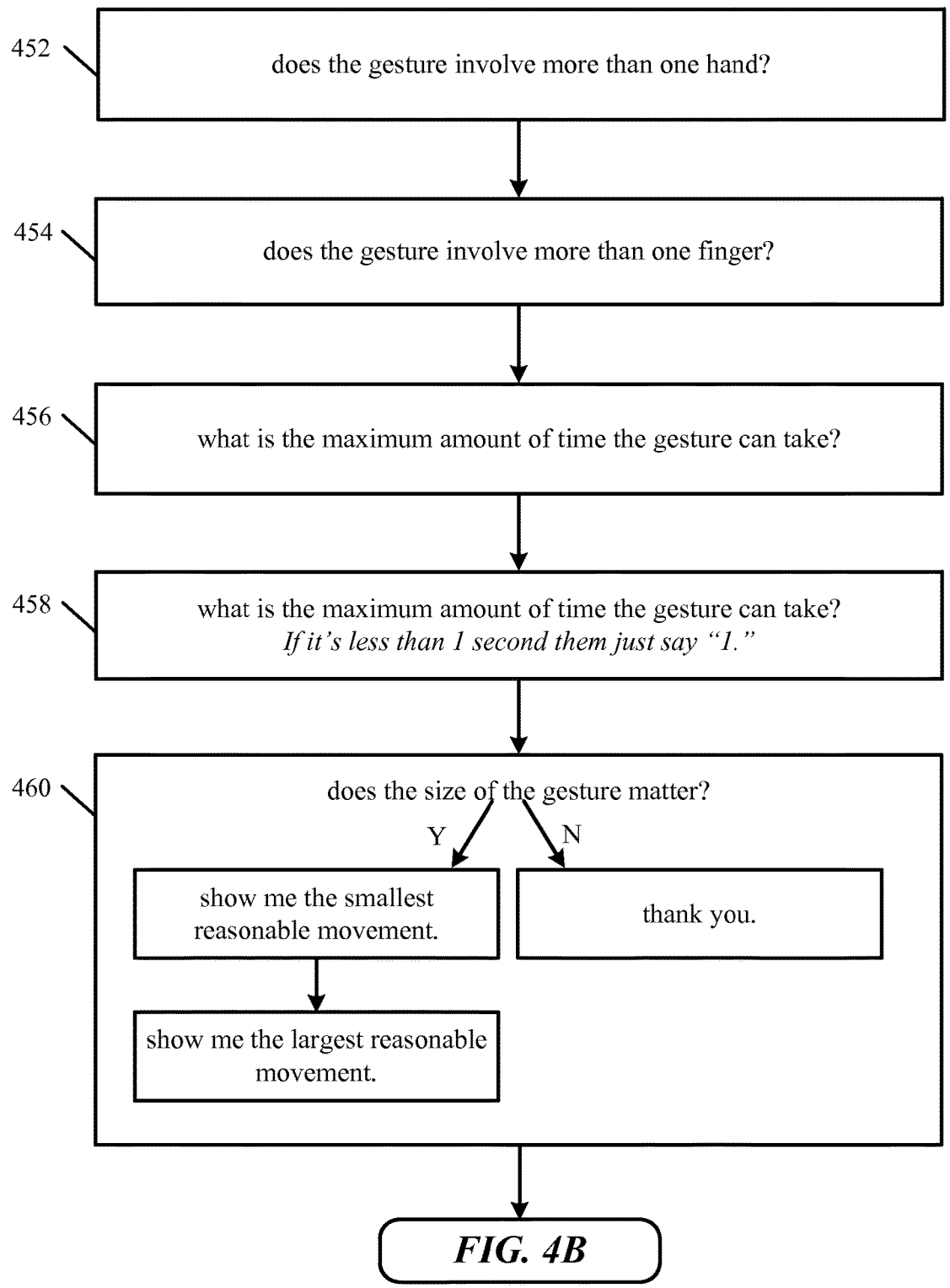
Figure 4B:
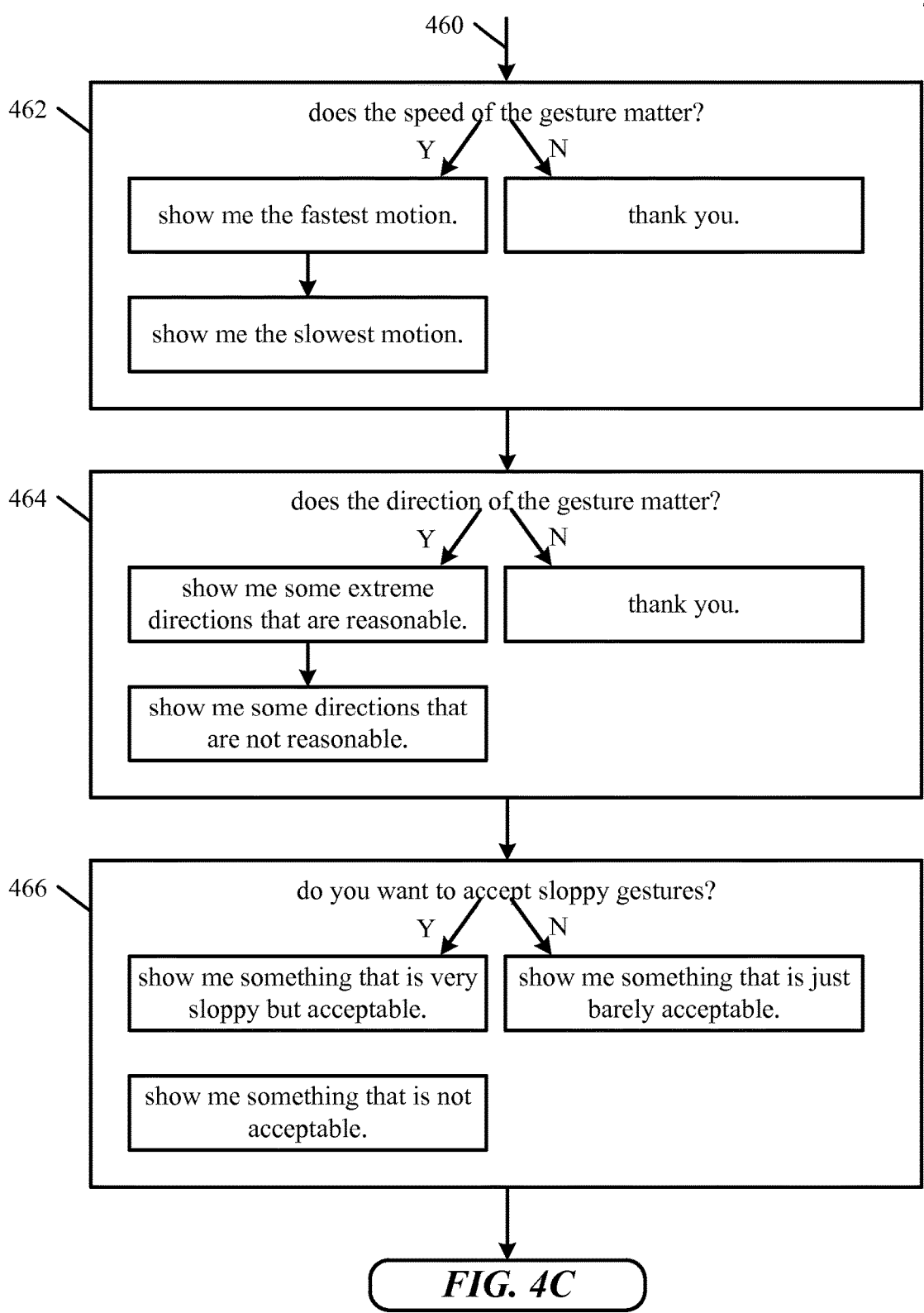

FIGS. 4A, 4B, and 4C show a series of questions and prompts 400A, 400B, and 400C for an exemplary training-guidance flow in accordance with one implementation. As shown, the user is first asked how many hands and fingers are involved in the gesture at actions 452 and 454. Then, the system establishes the overall time period for the gesture by inquiring about maximum and minimum amounts of time the gesture can take at action 456. For the minimum amount of time, a lower cut-off, such as one second, may be set at action 458.

In the next few interactions, the system asks the user whether the size, speed, and direction of the gesture matter. If the size matters, the user is asked to demonstrate the smallest and largest reasonable movements at action 460. As a result of this demonstration, the auto-generated recognizer (i.e., the object created based on the user input during training) can subsequently quantify the size of a gesture as well as compute a gesture output of normalized size. Relevant training parameters include movement parameters indicative of the motion, path, start and stop points, arc length, etc., and/or combinations thereof, and/or parameters computed from the foregoing. If the size does not matter, the gesture is always normalized and size is not taken into account. Relevant training parameters in this case include normalized movement parameters (including, e.g., motion, path, start and stop points, arc length, etc., and/or combinations thereof, and/or parameters computed from the foregoing).

If the speed matters, the user is requested to demonstrate the fastest and slowest motions at action 462. From the observed motions, the system may silently check acceleration ranges. The speed demonstrations enable the auto-generated recognizer to output speed (e.g., based on a Fourier transform of the time-variable speed along the gesture, which allows identifying a characteristic speed from data in the frequency domain). Relevant training parameters include the translation distance (e.g., Euclidean distance, i.e., $(dx^2+dy^2+dz^2)^{1/2}$) and time duration window (i.e., how long the gesture goes on indicates the relevant time span for analysis). If speed does not matter, gestures are speed-normalized. To characterize the temporal aspects of the gesture, time is converted to space, i.e., using uniform sampling (e.g., over time a point on the hand moves in one direction). The gesture is then stretched, shrunk, and matched to templates to extract information regarding velocity over time. Training parameters include the curvature and torsion of the resulting curve.

If the direction of the gesture matters, the user is asked to demonstrate both various reasonable and various unreasonable directions at action 464. As a result, the auto-generated recognizer is enabled to output whether a gesture is being emitted, the level of certainty and/or error, and/or movement parameters (e.g., motion, path, start and stop points, arc length, translational ranges, etc. and/or combinations thereof, and/or parameters computed from combinations thereof). If the direction does not matter, training parameters are simply curvature and torsion.

Furthermore, the user is asked to decide whether sloppy gestures ought to be accepted at action 466. If so, the system request that the user demonstrate a very sloppy, but still acceptable gesture. Otherwise, the system attempts to ascertain the limits of what is acceptable by asking the user to demonstrate both a barely acceptable gesture and gestures that is not acceptable.

Finally, after all relevant parameters have been set during the training, the gesture-recognition capabilities of the system are tested at action 468. The user may be asked to perform a gesture—either the one which the system was just trained to recognize, or another one. To indicate the beginning and end of the gesture, the user may press, e.g., the spacebar on the keyboard. Following performance of a gesture by the user, the system indicates whether it recognized this gestures as the one it was previously trained for or not, and request confirmation or correction from the user. The test can be repeated multiple times. Results from multiple passes can be combined (e.g., averaged, etc.) or a best one can be selected by the user. The above-described interaction is, of course, only one example. Other implementations may present questions and/or prompts in a different order, or ask additional or different questions.

The above-described 3D user interaction technique described herein therefore enables the user to intuitively control and manipulate the electronic device and virtual objects by simply performing body gestures. Because the gesture-recognition system facilitates rendering of reconstructed 3D images of the gestures with high detection sensitivity, dynamic user interactions for display control are achieved in real time without excessive computational complexity. For example, the user can dynamically control the relationship between his actual movement and the corresponding action displayed on the screen. In addition, the device may display an on-screen indicator to reflect a degree of completion of the user's gesture in real time. The current technology disclosed thus enables the user to dynamically interact with virtual objects displayed on the screen and advantageously enhances the realism of the virtual environment.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein may be used without departing from the spirit and scope of the technology disclosed. Accordingly, the described implementations are to be considered in all respects as only illustrative and not restrictive.

Particular Implementations

In one implementation, a method of distinguishing between interesting gestures from non-interesting gestures in a three-dimensional (3D) sensory space is described. The method includes receiving input defining reference characteristics of one or more reference gestures, detecting one or more actual gestures in a three-dimensional (3D) sensory space using an electronic sensor and determining actual characteristics using data from the electronic sensor, comparing the actual gestures against the reference gestures to determine a set of gestures of interest, and providing the set of gestures of interest and corresponding gesture parameters to a further process.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In one implementation, when a reference characteristic is gesture path, actual gestures with straight paths, such as lateral sweeps, are interpreted as the set of gestures of interest. When a reference characteristic is gesture velocity, actual gestures with high velocities are interpreted as the set of gestures of interest, according to one implementation. When a reference characteristic is gesture configuration, actual gestures made using a hand pointing with a particular finger are interpreted as the set of gestures of interest, according to one implementation. When a reference characteristic is gesture configuration, actual gestures of hands making a fist are interpreted as the set of gestures of interest, according to one implementation.

In another implementation, when a reference characteristic is gesture shape, actual gestures of hands with thumbs-up are interpreted as the set of gestures of interest. When a reference characteristic is gesture length, waving gestures are interpreted as the set of gestures of interest, according to one implementation. In yet another implementation, when a reference characteristic is gesture position, actual gestures within a threshold proximity to the electronic sensor are interpreted as the set of gestures of interest. When a reference characteristic is gesture duration, actual gestures within the 3D sensory space for a threshold time-period are interpreted as the set of gestures of interest rather than actual gestures within the 3D sensory space for time-period less than the threshold time-period.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of customizing gesture interpretation for a particular user is described. The method includes, prompting a user to select values for characteristics of a gesture in free-space and receiving selected values for the, prompting the user to perform a characteristic focused demonstration of boundaries of the gesture in a three-dimensional (3D) sensory space, determining, from the focused demonstration of boundaries captured by an electronic sensor, a set of parameters of the gesture, and storing the set of parameters and corresponding values for recognizing gestures.

This method and other implementations of the technology disclosed can include one or more of the following features and/or features described in connection with additional methods disclosed.

The method also includes using a questionnaire for prompting the user to select values for characteristics of the gesture. In one implementation, prompting the user to select values for characteristics of the gesture using the questionnaire includes receiving from the user a minimum threshold time-period for the gesture to be within the 3D sensory space before which the gesture is not interpreted. In another implementation, performing characteristic focused demonstration of boundaries includes the user making a hand pointing gesture with a particular finger as a gesture configuration. Performing characteristic focused demonstration of boundaries also includes the user making a fist gesture with a hand as a gesture configuration. Performing characteristic focused demonstration of boundaries further includes the user making thumbs-up or thumb-down gesture with a hand as a gesture shape.

In one implementation, performing characteristic focused demonstration of boundaries includes, the user making a thumbs-up or thumb-down gesture with a hand as a gesture shape. Performing characteristic focused demonstration of boundaries includes the user making a pinch gesture to set a minimum gesture distance as a gesture size, according to one implementation. In another implementation, performing characteristic focused demonstration of boundaries also includes the user making a waving gesture to set a maximum gesture distance as a gesture size.

In yet another implementation, performing characteristic focused demonstration of boundaries includes the user making a finger-flicking gesture to set a fastest gesture motion. In one implementation, performing characteristic focused demonstration of boundaries includes the user making a waving gesture to set a slowest gesture motion. Performing characteristic focused demonstration of boundaries includes the user making a lateral sweep to set a straight gesture path. Performing characteristic focused demonstration of boundaries includes, the user making a circular sweep to set a circular gesture path, according to one implementation.

It further includes testing interpretation of a particular gesture by prompting the user to perform a complete gesture demonstration of the particular gesture in the 3D sensory space, determining, from the complete gesture demonstration captured by the electronic sensor, a set of parameters of the particular gesture, comparing the set of parameters of the particular gesture with corresponding set of parameters determined from the focused demonstration of boundaries and selected values for characteristics, and reporting results of the comparison to the user and receiving a confirmation on whether interpretation of the particular gesture is correct.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In a further aspect, a machine-implemented method for recognizing gestures includes prompting for input of one or more characteristics broadly defining a gesture in free-space conveying information to a machine independent of surface contact, receiving input of the one or more characteristics, determining, from the input received, a set of training parameters defining the gesture, prompting for at least one example of the gesture, determining from the at least one example of the gesture a set of values corresponding to the set of training parameters, and providing the set of values to a storage for recognizing gestures. The method may include storing a set of object parameters defining at least one object displayable on a contact-free display and associated with the gesture.

Determining, from the example(s) of the gesture, a set of values corresponding to the set of training parameters may include determining whether to normalize at least one of the set of training parameters based at least in part upon the one or more characteristics, and, optionally, whether to ignore at least one of the set of training parameters based at least in part upon the one or more characteristics (which may include information indicating whether size of the gesture is important). The set of training parameters defining the gesture may also include at least one parameter defining at least one movement of the gesture. Prompting for at least one example of the gesture may include prompting for a smallest reasonable movement or prompting for a largest reasonable movement.

In another aspect, the technology disclosed relates to a non-transitory machine-readable medium storing one or more instructions which, when executed by one or more processors, cause the one or more processors to perform the following: prompting for input of one or more characteristics broadly defining a gesture in free-space conveying information to a machine independent of surface contact, receiving input of the one or more characteristics, determining, from the input received, a set of training parameters defining the gesture, prompting for at least one example of the gesture, determining from the at least one example of the gesture a set of values corresponding to the set of training parameters, and providing the set of values to a storage for recognizing gestures.

Reference throughout this specification to "one example," "an example," "one implementation," or "an implementation" means that a particular feature, structure, or characteristic described in connection with the example is included in at least one example of the present technology. Thus, the occurrences of the phrases "in one example," "in an example," "one implementation," or "an implementation" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

What is claimed is:

1. A method of a gesture system performing user-customized gesture recognition in a three-dimensional (3D) sensory space, the method including:
   in a user-initiated training environment, training the gesture system to recognize a user-defined customized gesture by:
      detecting, by an electronic sensor, a training gesture performed by the user in the 3D sensory space;
      determining a set of characteristic values for the detected training gesture using data captured by the electronic sensor; and
      storing the set of characteristic values for recognizing the training gesture as the user-defined customized gesture; and
   in a gesture interaction environment, performing gesture recognition of the user-defined customized gesture by:
      detecting an actual gesture performed by the user in the 3D sensory space using an electronic sensor;
      determining a set of characteristic values for the detected actual gesture using data from the electronic sensor;
      matching the determined set of characteristic values for the detected actual gesture with the stored set of characteristic values for the training gesture from among multiple stored sets of characteristic values;
      identifying the training gesture, for which the set of characteristic values matched the set of characteristic values of the detected actual gesture, as a gesture of interest; and
      displaying an on-screen indicator to reflect a degree of completion of the gesture of interest as the detected actual gesture is being performed by the user in real time, thereby enabling the user to dynamically control a relationship between actual movement of the user in real time and a corresponding action displayed in real time on the screen,
      wherein the degree of completion is displayed by the on-screen indicator in real time as the user continues to perform the detected actual gesture to reflect the degree of completion of the actual gesture, in real time, as performed by the user while dynamically interacting with virtual objects displayed on the screen.

2. The method of claim 1, further including identifying a set of gestures of interest by matching the determined set of characteristic values for the detected actual gesture with sets of characteristic values for multiple training gestures and providing the set of gestures of interest to a further process.

3. The method of claim 2, further including interpreting lateral sweeps as at least included in the set of gestures of interest, and wherein providing the set of gestures of interest further includes providing at least actual gestures with lateral sweeps to the further process.

4. The method of claim 2, further including a reference characteristic that includes a gesture velocity, and the method further including interpreting actual gestures with high velocities as at least included in the set of gestures of interest, and wherein providing the set of gestures of interest further includes providing at least actual gestures with a reference characteristic that indicates a high gesture velocity to the further process.

5. The method of claim 2, further including a reference characteristic that includes a gesture configuration, and the method further including interpreting actual gestures made using a hand pointing with a particular finger as at least included in the set of gestures of interest, and wherein providing the set of gestures of interest further includes providing at least actual gestures with a reference characteristic that indicates a gesture made using a hand pointing with a particular finger to the further process.

6. The method of claim 2, further including a reference characteristic that includes a gesture configuration, and the method further including interpreting actual gestures of hands making a first as at least included in the set of gestures of interest, and wherein providing the set of gestures of interest further includes providing at least actual gestures with a reference characteristic that indicates a gesture made using a hand making a first to the further process.

7. The method of claim 2, further including a reference characteristic that includes a gesture shape, and the method further including interpreting actual gestures of hands with thumbs-up as at least included in the set of gestures of interest, and wherein providing the set of gestures of interest further includes providing at least actual gestures with a reference characteristic that indicates a gesture made using a hand with a thumbs-up to the further process.

8. The method of claim 2, further including a reference characteristic that includes a gesture length, and the method further including interpreting waving gestures as at least included in the set of gestures of interest, and wherein providing the set of gestures of interest further includes providing at least actual gestures with a reference characteristic that indicates a waving gesture to the further process.

9. The method of claim 2, further including a reference characteristic that includes a gesture position, and the method further including interpreting actual gestures made by a hand within a threshold proximity to the electronic sensor as at least included in the set of gestures of interest, and wherein providing the set of gestures of interest further includes providing at least actual gestures with a reference characteristic that indicates a gesture made within a threshold proximity to the electronic sensor to the further process.

10. The method of claim 2, further including a reference characteristic that includes gesture duration, further including interpreting actual gestures within the 3D sensory space for a threshold time-period as at least included in the set of gestures of interest rather than actual gestures within the 3D sensory space for time-period less than the threshold time-period, and wherein providing the set of gestures of interest further includes providing at least actual gestures with a reference characteristic that indicates a gesture made within a threshold time-period to the further process.

11. The method of claim 1, further including:
prompting a user to respond to questions about characteristics of performing a first gesture including information about a minimum and maximum amount of time the first gesture takes to perform, threshold time-period, number of hands and fingers involved in making the first gesture, and whether size, speed, or direction of the first gesture matters;
responsive to receiving a response from the user that size of the first gesture matters, prompting the user to demonstrate the smallest and largest reasonable movements to perform the first gesture in a three-dimensional (3D) sensory space;
determining, from demonstration by the user of the smallest and largest reasonable movements of the user captured by an electronic sensor, a set of movement parameter values of the first gesture; and
storing the set of movement parameter values of the first gesture for recognizing subsequent instances of the first gesture performed by the user.

12. The method of claim 11, further including using a questionnaire for prompting the user to select values for characteristics of the gesture.

13. The method of claim 12, wherein prompting the user to select values for characteristics of the gesture using the questionnaire includes receiving from the user a minimum threshold time-period for the gesture to be within the 3D sensory space before which the gesture is not interpreted.

14. The method of claim 11, wherein demonstration by the user of the smallest and largest reasonable movements of the user captured by an electronic sensor includes the user making a hand pointing gesture with a particular finger as a gesture configuration.

15. The method of claim 11, wherein demonstration by the user of the smallest and largest reasonable movements of the user captured by an electronic sensor includes the user making a first gesture with a hand as a gesture configuration.

16. The method of claim 11, wherein demonstration by the user of the smallest and largest reasonable movements of the user captured by an electronic sensor includes the user making a thumbs-up gesture with a hand as a gesture shape.

17. The method of claim 11, wherein demonstration by the user of the smallest and largest reasonable movements of the user captured by an electronic sensor includes the user making a thumb-down gesture with a hand as a gesture shape.

18. The method of claim 11, wherein demonstration by the user of the smallest and largest reasonable movements of the user captured by an electronic sensor includes the user making a pinch gesture to set a minimum gesture distance as a gesture size.

19. The method of claim 11, wherein demonstration by the user of the smallest and largest reasonable movements of the user captured by an electronic sensor includes the user making a waving gesture to set a maximum gesture distance as a gesture size.

20. The method of claim 11, wherein demonstration by the user of the smallest and largest reasonable movements of the user captured by an electronic sensor includes the user making a finger-flicking gesture to set a fastest gesture motion.

21. The method of claim 11, wherein demonstration by the user of the smallest and largest reasonable movements of the user captured by an electronic sensor includes the user making a waving gesture to set a slowest gesture motion.

22. The method of claim 11, wherein demonstration by the user of the smallest and largest reasonable movements of the user captured by an electronic sensor includes the user making a lateral sweep to set a straight gesture path.

23. The method of claim 11, demonstration by the user of the smallest and largest reasonable movements of the user captured by an electronic sensor includes the user making a circular sweep to set a circular gesture path.

24. The method of claim 11, further including testing interpretation of a particular gesture by:
prompting the user to perform a complete gesture demonstration of the particular gesture in the 3D sensory space;
determining, from the complete gesture demonstration captured by the electronic sensor, a set of parameters of the particular gesture;
comparing the set of parameters of the particular gesture with corresponding set of parameters determined from the user demonstration of the smallest and largest reasonable movements; and
reporting results of the comparing to the user and receiving a confirmation on whether interpretation of the particular gesture is correct.

25. The method of claim 11, wherein the user is a first user, and further comprising:
prompting a second user to respond to questions about performing the first gesture;
responsive to the second user demonstrating smallest and largest reasonable movements to perform the first gesture in a three-dimensional (3D) sensory space, determining a set of movement parameters values of the gesture; and
storing the set of movement parameters values for recognizing the first gesture performed by the second user.

26. The method of claim 25, further comprising:
detecting one or more actual gestures performed by the second user in a three-dimensional (3D) sensory space using an electronic sensor and determining actual characteristic values for the one or more actual gestures detected using data from the electronic sensor;
retrieving the characteristic values for recognizing the first gesture performed by the second user stored;
recognizing a set of gestures of interest by matching the actual characteristic values of the one or more actual gestures with the characteristic values retrieved; and
providing the set of gestures of interest recognized to a further process.

27. The method of claim 11, wherein a movement parameter is one of curvature of path, velocity, direction, and attributes of an object making the gesture.

28. The method of claim 11, wherein a gesture characteristic identified for assigning a user-customized value is selected by the user.

29. The method of claim 11, wherein a gesture characteristic identified for assigning a user-customized value is selected by a gesture training system that leads the user through a sequence of assigning characteristic values.

30. The method of claim 1, further including storing a set of object parameters defining at least one object displayable on a contact-free display and associated with the gesture.

31. A non-transitory computer readable medium storing computer program instructions to customize gesture interpretation for a particular user, the instructions, when executed on a processor, implement a method including:
in a user-initiated training environment, training a gesture system to recognize a user-defined customized gesture by:
detecting, by an electronic sensor, a training gesture performed by the user in a three-dimensional (3D) sensory space;
determining a set of characteristic values for the detected training gesture using data captured by the electronic sensor; and
storing the set of characteristic values for recognizing the training gesture as the user-defined customized gesture; and
in a gesture interaction environment, performing gesture recognition of the user-defined customized gesture by:
detecting an actual gesture performed by the user in a the 3D sensory space using an electronic sensor;
determining a set of characteristic values for the detected actual gesture, using data from the electronic sensor;
matching the determined set of characteristic values for the detected actual gesture with the stored set of characteristic values for the training gesture from among multiple stored sets of characteristic values;
identifying the training gesture, for which the set of characteristic values matched the set of characteristic values of the detected actual gesture, as a gesture of interest; and
displaying an on-screen indicator to reflect a degree of completion of the gesture of interest as the detected actual gesture is being performed by the user in real time, thereby enabling the user to dynamically control a relationship between actual movement of the user in real time and a corresponding action displayed in real time on the screen,
wherein the degree of completion is displayed by the on-screen indicator in real time as the user continues to perform the detected actual gesture to reflect the degree of completion of the actual gesture, in real time, as performed by the user while dynamically interacting with virtual objects displayed on the screen.

32. The non-transitory computer readable medium of claim 31, the method further including:
prompting a user to respond to questions about characteristics of performing a first gesture including information about a minimum and maximum amount of time the first gesture takes to perform, threshold time-period, number of hands and fingers involved in making the first gesture, and whether size, speed, or direction of the first gesture matters;
responsive to receiving a response from the user that size of the first gesture matters, prompting the user to demonstrate the smallest and largest reasonable movements to perform the first gesture in a three-dimensional (3D) sensory space;
determining, from demonstration by the user of the smallest and largest reasonable movements of the user captured by an electronic sensor, a set of movement parameter values of the first gesture; and
storing the set of movement parameter values of the first gesture for recognizing subsequent instances of the first gesture performed by the user.

* * * * *